(12) United States Patent
Cai et al.

(10) Patent No.: US 9,119,049 B2
(45) Date of Patent: Aug. 25, 2015

(54) VOICE NOTIFICATION TO THE DESTINATION OF A TEXT MESSAGE THAT IS ENGAGED IN A VOICE CALL

(75) Inventors: Yigang Cai, Naperville, IL (US); Xiangyang Li, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/634,955

(22) PCT Filed: Mar. 17, 2010

(86) PCT No.: PCT/CN2010/071091
§ 371 (c)(1),
(2), (4) Date: Sep. 14, 2012

(87) PCT Pub. No.: WO2011/113197
PCT Pub. Date: Sep. 22, 2011

(65) Prior Publication Data
US 2013/0005371 A1    Jan. 3, 2013

(51) Int. Cl.
*H04W 4/14*    (2009.01)
*H04W 4/18*    (2009.01)
*H04L 29/06*    (2006.01)
(Continued)

(52) U.S. Cl.
CPC ............ *H04W 4/18* (2013.01); *H04L 65/103* (2013.01); *H04L 65/105* (2013.01); *H04L 65/1006* (2013.01); *H04L 65/1016* (2013.01); *H04L 65/1069* (2013.01); *H04L 65/4023* (2013.01); *H04W 4/12* (2013.01); *H04W 4/16* (2013.01); *H04W 68/00* (2013.01)

(58) Field of Classification Search
CPC ...................................... H04W 4/14

USPC ....................... 455/466, 558, 456.2
See application file for complete search history.

(56) References Cited

U.S. PATENT DOCUMENTS 6,470,181 B1 * 10/2002 Maxwell ................ 455/413
7,136,478 B1 * 11/2006 Brand et al. ............ 379/265.09
(Continued)

FOREIGN PATENT DOCUMENTS

CN    1612620 A    5/2005
CN    101378530 A   3/2009
(Continued)

OTHER PUBLICATIONS

International Search Report for PCT/CN2010/071091 dated Dec. 16, 2010.

*Primary Examiner* — Jinsong Hu
*Assistant Examiner* — Jean Chang
(74) *Attorney, Agent, or Firm* — Fay Sharpe LLP

(57) ABSTRACT

Systems and methods are disclosed that provide a voice notification to an end user while the end user is on an active voice call, where the voice notification includes information on a text message that was received. A system in one embodiment includes a message delivery system that receives a text message intended for a destination, and initiates delivery of the text message to the destination. The system also includes a message notification system that detects that the destination is engaged in an active voice call during the delivery of the text message, identifies information for the text message, converts the text message information into voice data to generate a voice notification, and initiates transmission of the voice notification to the destination to be played during the active voice call.

20 Claims, 6 Drawing Sheets

(51) Int. Cl.
*H04W 4/12* (2009.01)
*H04W 4/16* (2009.01)
*H04W 68/00* (2009.01)

(56) References Cited

U.S. PATENT DOCUMENTS

| | | | |
|---|---|---|---|
| 7,573,985 B2 * | 8/2009 | McClelland et al. | 379/52 |
| 8,571,584 B1 * | 10/2013 | Ruf et al. | 455/466 |
| 8,612,522 B1 * | 12/2013 | Sylvain | 709/206 |
| 2002/0006802 A1 * | 1/2002 | Saarela et al. | 455/466 |
| 2004/0088358 A1 * | 5/2004 | Boda et al. | 709/206 |
| 2005/0136896 A1 * | 6/2005 | Ward et al. | 455/413 |
| 2005/0286689 A1 | 12/2005 | Vuori | |
| 2007/0254684 A1 | 11/2007 | Jiang | |
| 2009/0279556 A1 * | 11/2009 | Selitser et al. | 370/401 |
| 2009/0298519 A1 * | 12/2009 | Chan et al. | 455/466 |
| 2010/0150333 A1 * | 6/2010 | Goodman et al. | 379/207.02 |

FOREIGN PATENT DOCUMENTS

| | | |
|---|---|---|
| JP | 10-303970 | 11/1998 |
| JP | 2006-191600 A | 7/2006 |
| JP | 2006-340118 A | 12/2006 |

* cited by examiner

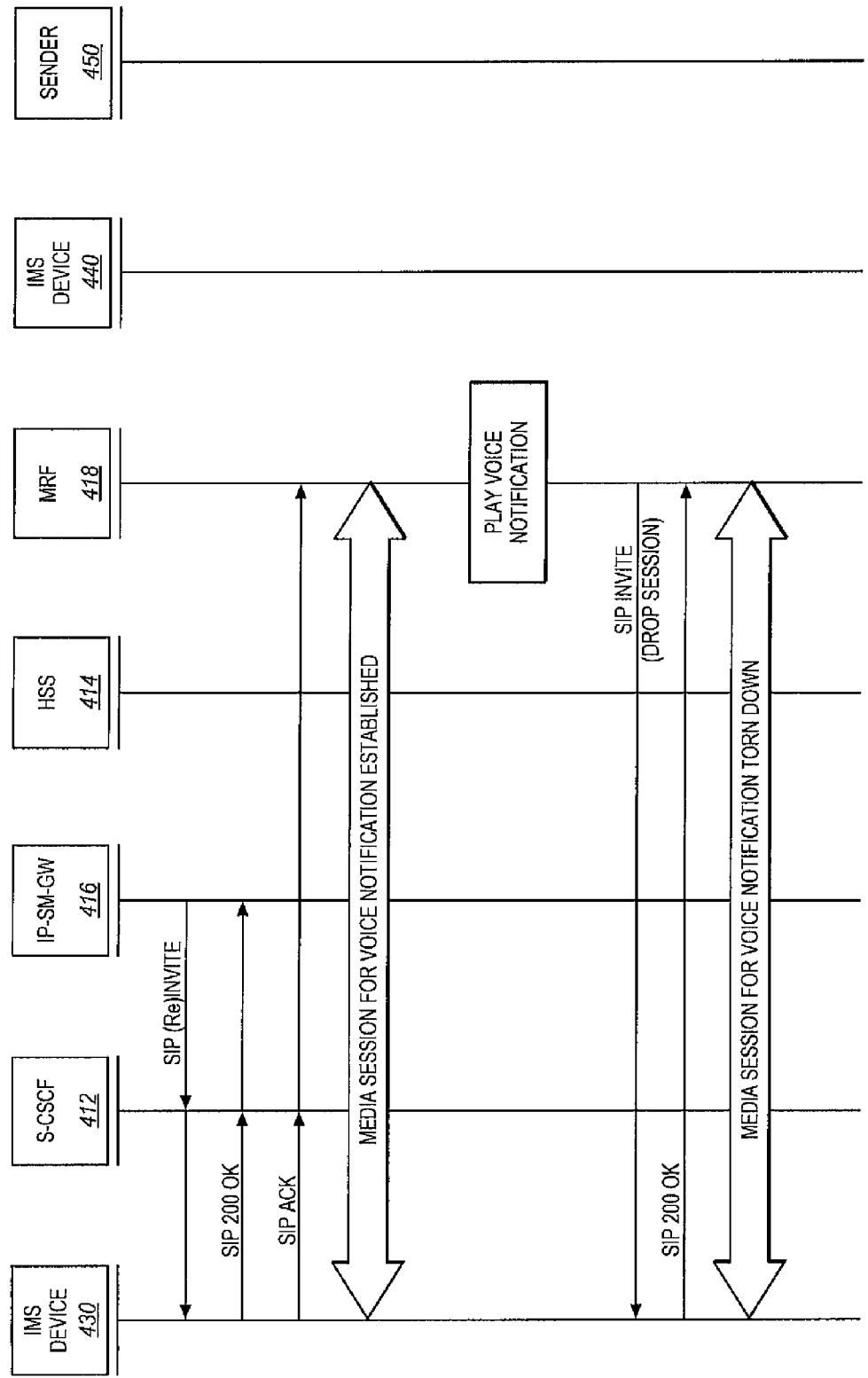

VOICE NOTIFICATION TO THE DESTINATION OF A TEXT MESSAGE THAT IS ENGAGED IN A VOICE CALL

BACKGROUND

1. Field of the Invention

The invention is related to the field of communications and, in particular, to notifying an individual that a text message is received while the individual is on a voice call.

2. Statement of the Problem

Text messaging has become a very popular mode of communication in many mobile networks, such as a Public Land Mobile Network (PLMN). One example of text messaging is Short Message Service (SMS), which is a communication protocol allowing the exchange of short text messages (i.e., 160 characters) between mobile devices. While the term "text message" traditionally referred to text-only messages sent using SMS, it has been extended to include multimedia messages, such as images, video, sound content, etc. The multimedia messages may be sent using Multimedia Service (MMS) protocol. Often times, mobile users more frequently use text messaging for communication than voice calls.

A sender of a new text message enters one or more intended destinations for the message, and also enters the content of the message. The phone (or other sending device) of the sender formats the text message into the proper protocol, and sends the text message to a message center in the network over the appropriate signaling channels. One example of a typical message center is an SMS Center (SMSC). The SMSC then attempts to deliver the SMS message its destination. Those skilled in the art will appreciate that text message delivery includes multiple other network elements than those described above, such as serving network elements, subscriber databases, gateways, etc.

There may be times where the destination of a text message is engaged in an active voice call at the time the text message is delivered. For example, assume that the destination comprises a mobile phone being operated by an end user. In response to receiving the text message, the mobile phone may provide some type of alert to the end user that the text message was received, such as a beep or tone. If the end user wants to view the text message, then he/she may end the voice call and view the text message. The end user may alternatively remove the phone from his/her ear and try to view the text message without accidently ending the voice call. In any event, it is presently inconvenient for the end user to view a text message that is received while a voice call is in progress.

SUMMARY

Embodiments described herein provide a voice notification to an end user while the end user is on an active voice call. The voice notification includes information on a text message that was received, which may be played as a background during the voice call. Thus, the end user may listen to the voice notification during the voice call to find out who sent the text message, what the text message is about, etc. The end user is advantageously informed of the essence of the text message during the voice call without having to actually view the text message and interrupt the voice call.

One embodiment comprises a system operable to provide voice notifications to an end user. The system includes a message delivery system operable to receive a text message intended for a destination, and to initiate delivery of the text message to the destination. The system also includes a message notification system operable to detect that the destination is engaged in an active voice call during the delivery of the text message, to identify information for the text message, to convert the text message information into voice data to generate a voice notification, and to initiate transmission of the voice notification to the destination to be played during the active voice call.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIGS. 5-7 are message diagrams illustrating voice notification for an SMS message in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
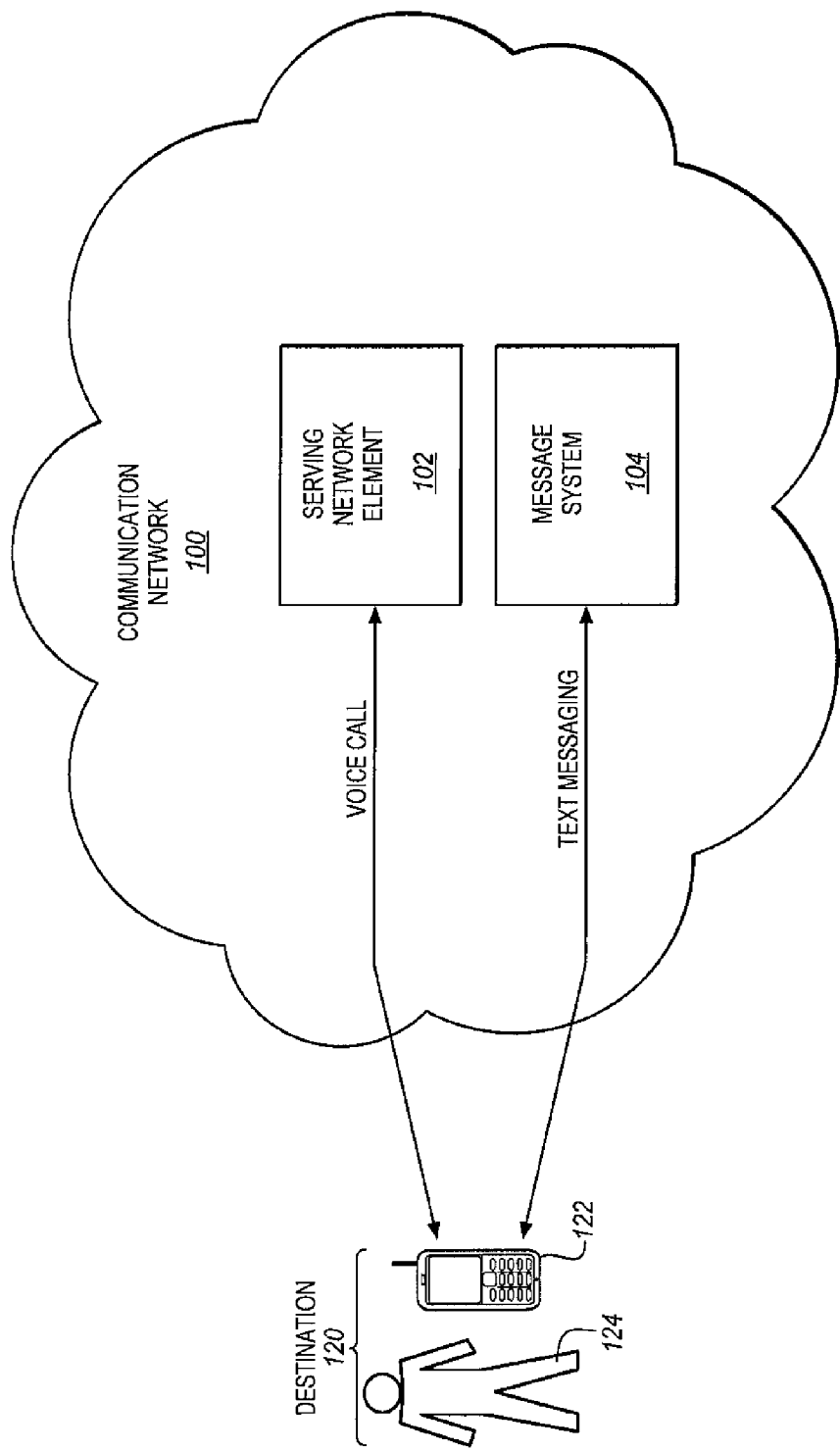
FIG. 1 illustrates a communication network in an exemplary embodiment.

FIG. 1 illustrates a communication network 100 in an exemplary embodiment. Communication network 100 provides communication service to a communication device 122 being operated by an end user 124. The communication services offered and provided by communication network 100 may vary depending on the subscription of end user 124. At a minimum, end user 124 subscribes to voice calling and text messaging from communication network 100. Communication network 100 may comprise a circuit-based mobile or wireline network, such as a CDMA network, a GSM network, a Public Switched Telephone Network (PSTN), etc. Communication network 100 may also comprise a packet-based network, such as an IP Multimedia Subsystem (IMS) network. Because communication network 100 may represent different types of networks, device 122 may likewise represent different types of devices, such as a mobile or cellular device, a wireline device, a SIP phone, a dual mode device, etc.

In this embodiment, communication network 100 includes a serving network element 102 and a message system 104. Serving network element 102 comprises any switch, server, router, or other node in a core network that sets up or connects voice calls to device 122. For instance, serving network element 102 may comprise an MSC in a circuit-based network, may comprise a Serving-Call Session Control Function (S-CSCF) in a packet-based IMS network, may comprise a router in a packet-based network that connects a Real-Time Protocol (RTP) session, etc. The voice calls are connected to other devices or systems not shown in FIG. 1 for the sake of brevity.

Message system 104 comprises any system, server, or device that facilitates delivery of text messages to device 122. In the embodiments described below, message system 104 is also able to provide a voice notification to end user 124 while the end user 124 is on a voice call. The voice notification provided by message system 104 includes information on a text message that is received by device 122 while end user 124 is on a voice call using device 122. For example, the voice notification may identify a sender of the text message, may identify content from the text message, etc. Message system 104 may be implemented in multiple locations of communication network 100. For example, message system 104 may be implemented in a message center (not shown), such as an SMSC. Message system 104 may be implemented in a gateway (not shown), such as an IP Short Message Gateway (IP-SM-GW). Message system 104 may be implemented as a stand alone server or network node, or may be distributed among multiple network elements. Because message system 104 may be implemented in multiple locations within network 100, it is merely shown as being included within network 100 and not tied to any specific network node.

Figure 2:
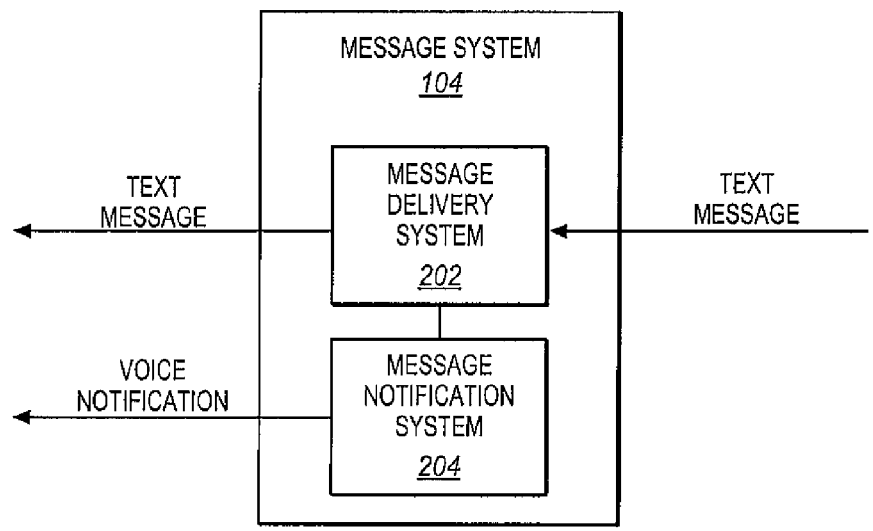
FIG. 2 illustrates a message system in an exemplary embodiment.

FIG. 2 illustrates message system 104 in an exemplary embodiment. Message system 104 includes a message delivery system 202 and a message notification system 204. Message delivery system 202 comprises any device, component, or element operable to receive text messages, and initiate delivery of the text messages to their intended destinations. Message notification system 204 comprises any device, component, or element operable to initiate transmission of a voice notification that includes information on a text message. A more detailed operation of message notification system 204 is illustrated in FIG. 3.

Figure 3:
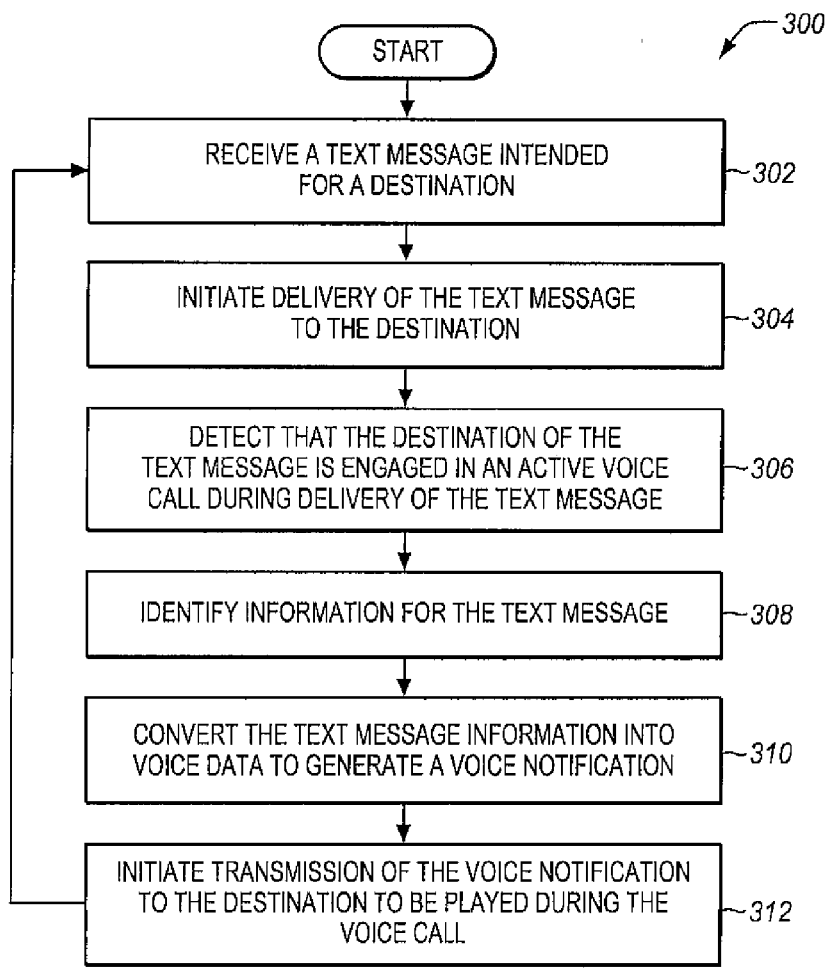
FIG. 3 is a flow chart illustrating a method of providing a voice notification of a text message in an exemplary embodiment.

FIG. 3 is a flow chart illustrating a method 300 of providing a voice notification of a text message in an exemplary embodiment. The steps of method 300 will be described with reference to communication network 100 in FIG. 1 and message system 104 in FIG. 2, but those skilled in the art will appreciate that method 300 may be performed in other networks and systems. The steps of the flow charts described herein are not all inclusive and may include other steps not shown. The steps may also be performed in an alternative order.

In step 302, message delivery system 202 receives a text message that is intended for one or more destinations. In FIG. 1, the combination of device 122 and end user 124 may be referred to generally as destination 120 (see FIG. 1). Thus, when the term "destination" is used herein, it may refer to device 122, to end user 124, or both. Step 302 may be clarified to state that the text message received is intended for destination 120. In step 304, message delivery system 202 initiates delivery of the text message to destination 120. Those skilled in the art will appreciate other additional steps may be used to deliver the text message to destination 120.

In addition to delivering the text message to destination 120, message notification system 204 detects that destination 120 is engaged in an active voice call during the delivery of the text message in step 306. Message notification system 204 may query another network element in network 100 to detect that destination 120 is engaged in an active voice call, such as by querying serving network element 102. Message notification system 204 may alternatively detect that destination 120 is engaged in an active voice call in other ways, such as querying device 122, querying a subscriber database (e.g., HLR or HSS), processing signaling for the text message, etc. An active voice call is defined as a voice call that is set up through call signaling, and bearer communications are established. With the bearer communications established, the voice call is in progress so that the parties to the call are able to have a voice conversation.

If destination 120 is engaged in an active voice call, then message notification system 204 may transmit a voice notification to destination 120 regarding the text message, such as illustrated in steps 308-312. Message notification system 204 may process criteria to determine whether to initiate transmission of the voice notification to destination 120. For example, the criteria may include the sender's identifier, the sender's location, the destination's location, the receiving time (e.g., time of day, day of week, day of month, etc), the language of the text, etc.

If the determination is to send the voice notification, message notification system 204 identifies information for the text message in step 308. The information identified in step 308 may comprise any information regarding the text message. For example, message notification system 204 may extract header information from the text message, such as a sender ID. Message notification system 204 may also extract content from the text message (e.g., all or a portion of the actual text message). Message notification system 204 may also identify other information for the text message, such as a location of the destination 120, a location of the sender of the text message, a time of day, a day of the week, a language of the text message, etc.

In step 310, message notification system 204 converts or translates the text message information into voice data to generate a voice notification. The text message information that is identified for the text message is in the form of text. Thus, message notification system 204 converts the text to voice, which may also be referred to as converting the text message information to speech or to a voice format. The conversion of the text message information into voice data results in a voice notification that is in an audible format. For example, the voice notification may be analog voice data, digital voice data, or some other voice signal that is audible. The voice notification is not simply a beep or tone indicating that a text message is received. The voice notification in the embodiments herein is in voice format and includes information about the text message, such as a sender ID, content of the text message, etc.

In step 312, message notification system 204 initiates transmission of the voice notification to destination 120 to be played during the active voice call. For example, device 122 receives the voice notification from message notification system 204. While end user 124 is conversing with another party during the voice call, device 122 plays the voice notification to end user 124. End user 124 is thus able to hear the voice notification during the voice call, which informs him/her of the information regarding the text message. For example, the voice notification may state "Message received from Randy Smith saying 'Meet me at the gym at 6'".

Because the voice notification is provided during the existing voice call, end user 124 knows that Randy Smith sent a text message requesting to meet at the gym at 6. Advantageously, end user 124 is notified of the sender and content of the text message audibly so that he/she does not have to interrupt the present voice call in order to view the text message. The audible voice notification is much more convenient to the end user 124.

EXAMPLE

Figure 4:
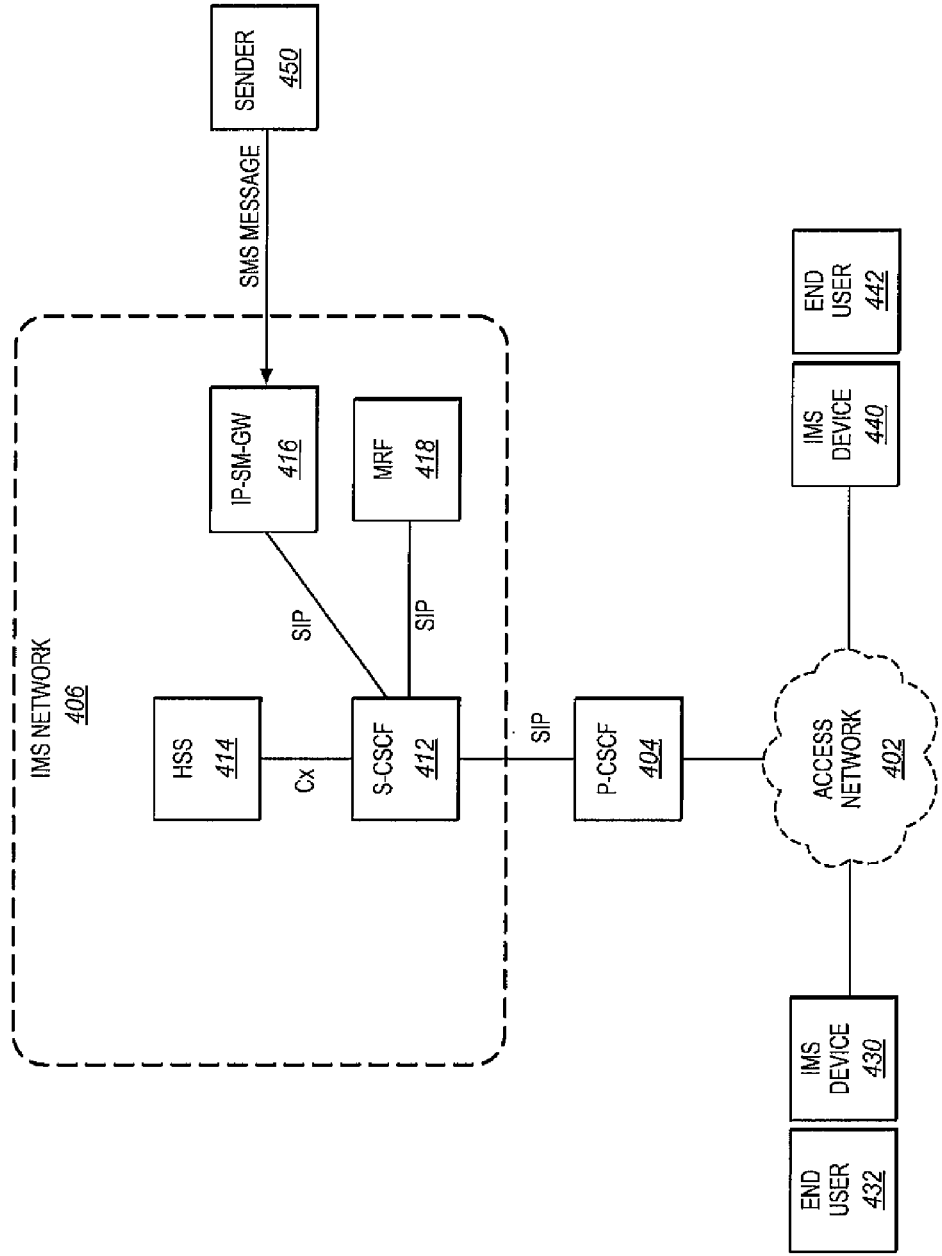
FIG. 4 illustrates a communication network in another exemplary embodiment.

FIG. 4 illustrates a communication network 400 in an exemplary embodiment. Communication network 400 includes one or more access networks 402, a Proxy-Call Session Control Function (P-CSCF) 404, and an IMS (core) network 406. Access network 402 allows IMS users to connect to IMS network 406. Access network 402 may comprise a fixed access network, such as a DSL network, a cable network, an Ethernet network, etc. Access network 402 may comprise a mobile access network, such as a W-CDMA network, a CDMA2000 network, a GSM network, a GPRS network, etc. Access network 402 may alternatively comprise a wireless access network, such as a WLAN, a WiFi network, a WiMAX network, etc. P-CSCF 404 is a SIP proxy that is the first point of contact for an IMS device when connecting to IMS network 406. In FIG. 4, there are at least two IMS devices 430 and 440 that are receiving service from IMS network 406.

IMS network 406 includes a Serving-CSCF (S-CSCF) 412, a Home Subscriber Server (HSS) 414, an IP Short Message Gateway (IP-SM-GW) 416, and a Media Resource Function (MRF) 418. S-CSCF 412 is the central node of the signaling plane, and performs session control for IMS devices that initiate sessions over IMS network 406. HSS 414 is a master user database that stores subscription-related information (e.g., subscriber profiles), performs authentication and authorization of end users, provides information about the subscriber's location, etc. IP-SM-GW 416 is an entity that provides protocol interworking for the submission of short messages from the sender to the S-CSCF 412 and for the delivery of short messages from S-CSCF 412 to a receiver. MRF 418 provides media related functions, such as media manipulation (e.g., voice stream mixing) and playing of tones and announcements. MRF 418 is divided into a Media Resource Function Controller (MRFC) and a Media Resource Function Processor (MRFP), although not specifically shown in FIG. 4. An MRFC is a signaling plane node that controls the MRFP. The MRFP is a media plane node that implements the media-related functions, such as playing tones and announcements.

Communication network 400 is able to provide a voice notification to the destination of an SMS message, where the voice notification includes some information about the SMS message. Although this example shows voice notification in an IMS network 406, those skilled in the art will appreciate that voice notifications may be provided in other types of core networks that allow for text messaging. Also, although this example shows voice notification for SMS messages, those skilled in the art will appreciate that voice notifications may be provided in other types of text messages, such as MMS messages.

Figure 5:
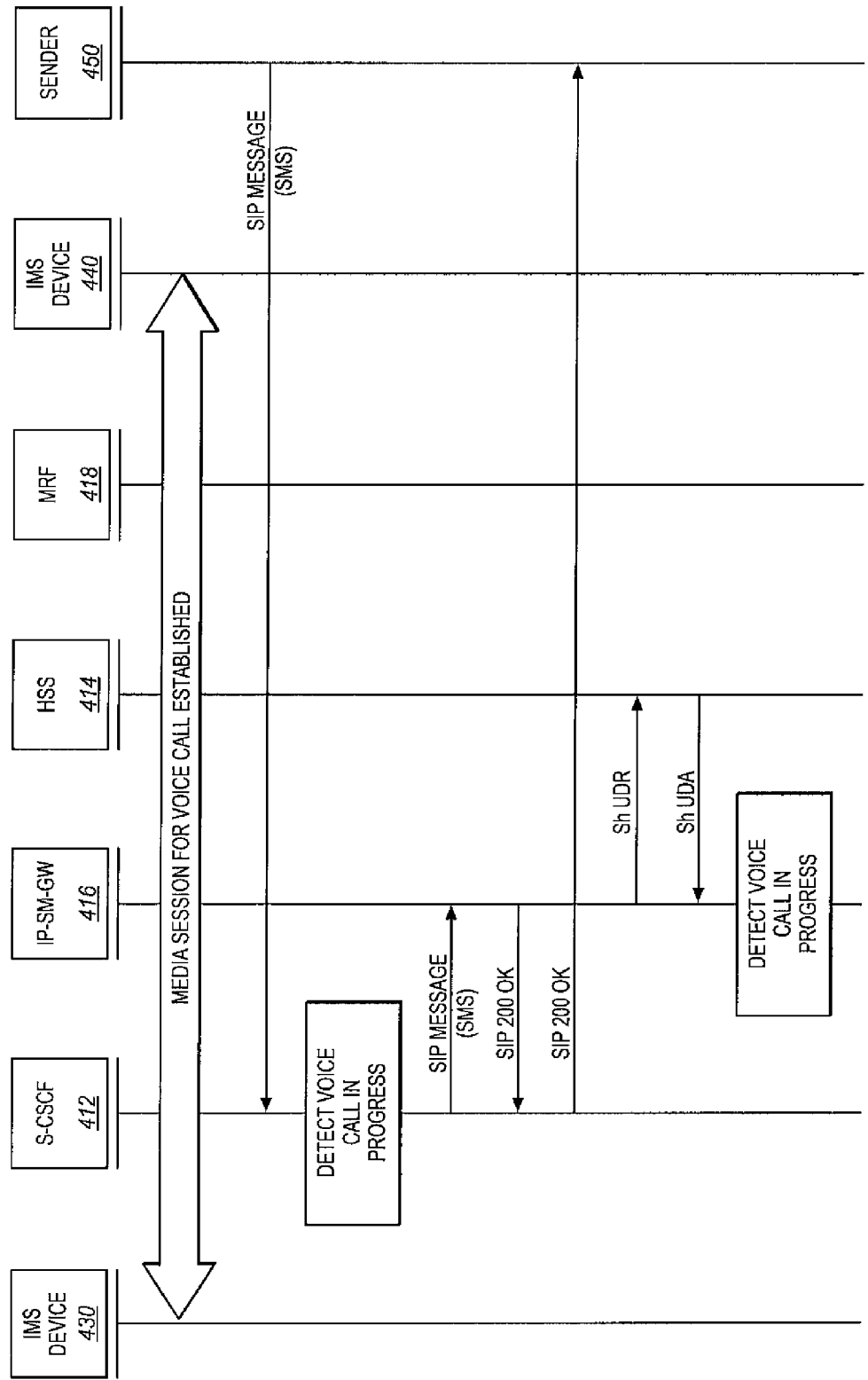
Figure 6:
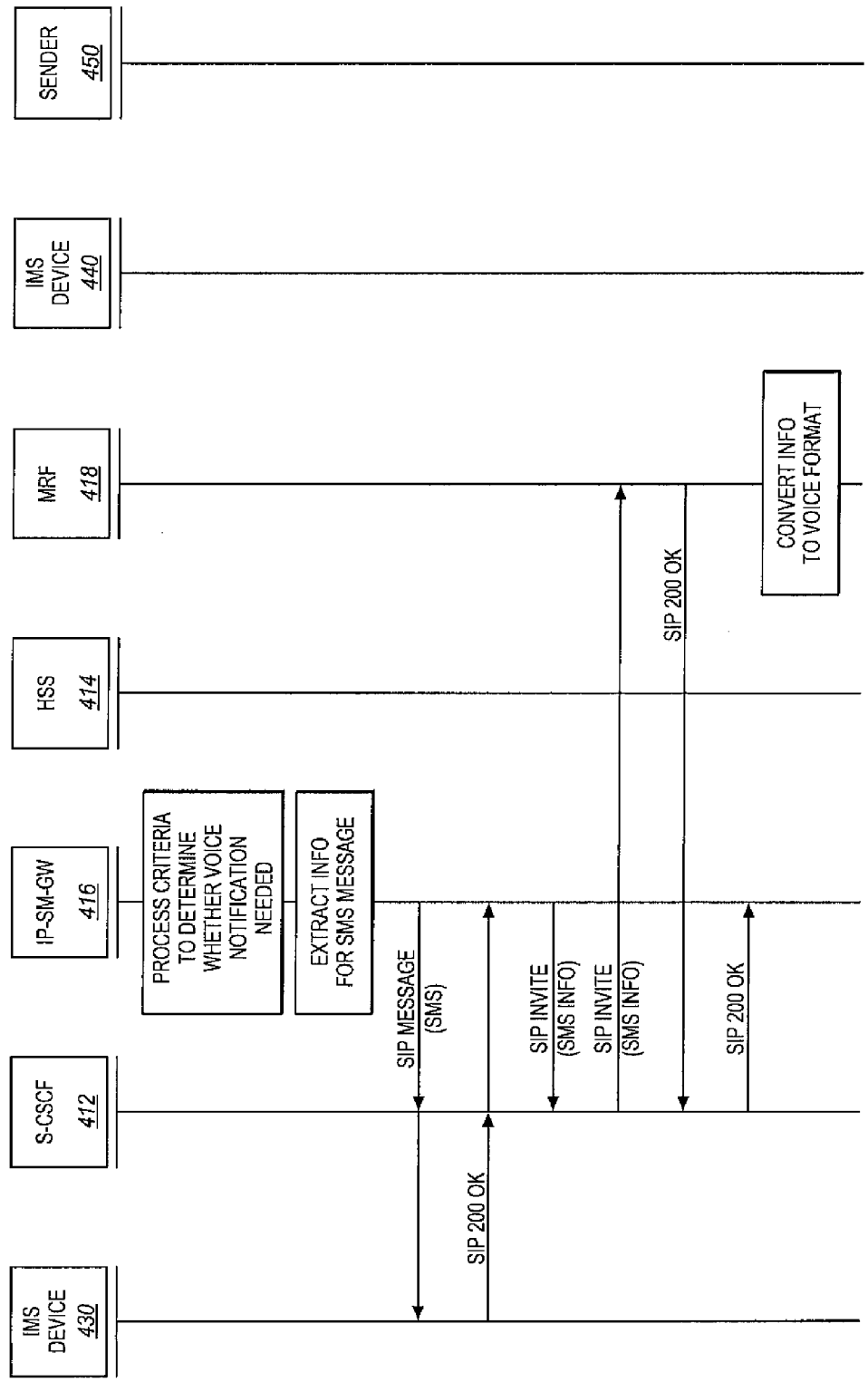

FIGS. 5-7 are message diagrams illustrating voice notification for an SMS message in an exemplary embodiment. In this example, one assumption is that a media session for a voice call is in progress between IMS device 430 and IMS device 440, and that end user 432 is conversing with end user 442 (see FIGS. 4-5). This means that an RTP session has been established between IMS device 430 and IMS device 440, and a voice conversation is in progress over the RTP session. Although IMS device 430 is shown as being involved in a media session with another IMS device 440, those skilled in the art will appreciate that IMS device 430 may be involved in a media session with any type of party, such as IMS, legacy network, etc.

At some point during the established media session, a sender 450 sends an SMS message, that is destined for IMS device 430, within a SIP MESSAGE. The SIP MESSAGE is received in S-CSCF 412. S-CSCF 412 processes the SIP MESSAGE to identify that it contains an SMS message, and needs to be forwarded to IP-SM-GW 416. Before sending the SIP MESSAGE to IP-SM-GW 416, S-CSCF 412 may determine whether or not IMS device 430 is engaged in a media session for a voice call. Because IMS device 430 is engaged in a media session in this example, S-CSCF 412 may insert an indicator in the SIP MESSAGE that IMS device 430 is engaged in a media session for a voice call. For example, the following illustrates an exemplary SIP MESSAGE formatted by S-CSCF 412:

```
MESSAGE tel:+19305020103 SIP/2.0
Via: SIP/2.0/UDP 135.1.62.120:5060;branch=z9hG4b
To: tel:+19305020103
From: tel:+19305020106;tag=1
Call-ID: 689e5af4451c0170@livemas1
Max-Forwards: 70
CSeq: 1 MESSAGE
P-Charging-Vector=icid-value="PCSF:192.161.1.xxx-xxxxxxxx"
Subject: sms w/ voice in progress
Content-Type: application/vnd.3gpp2.sms
Content-Length: 100
<<Encapsulated IS-637 Transport Layer Message>>
```

The SIP MESSAGE includes a "subject" field that is populated with an indication that a voice call is in progress.

After formatting the SIP MESSAGE to indicate that a voice call is in progress, S-CSCF 412 forwards the SIP MESSAGE to IP-SM-GW 416. In response to receiving the SIP MESSAGE, IP-SM-GW 416 responds back to the sender side with a SIP 200 OK. Also, IP-SM-GW 416 processes the SIP MESSAGE to identify the intended destination for the SMS message, which is IMS device 430. IP-SM-GW 416 locates an identifier for IMS device 430 (e.g., MDN=9305020103), and sends a Diameter Sh User Data Request (UDR) to HSS 414 to determine where to route the SMS message. HSS 414 responds with routing information in a Diameter Sh User Data Answer (UDA).

IP-SM-GW 416 also processes the SIP MESSAGE to detect whether or not an active voice call is in progress involving the intended destination for the SMS message, which is IMS device 430. The SIP MESSAGE in this example includes a "subject" field indicating whether or not IMS device 430 is on an active voice call. IP-SM-GW 416 can process this information to detect whether or not IMS device 430 is on an active voice call.

When the destination (IMS device 430) is on a voice call, IP-SM-GW 416 processes criteria to determine whether or not to provide a voice notification to destination (see FIG. 6). The decision of whether or not to provide a voice notification is selective based on a variety of factors. For example, the decision may be based on the sender's identifier, the sender's location, the destination's location, the receiving time (e.g., time of day, day of week, day of month, etc), the language of the text in the SMS message, or some other factors. The criteria used to make the selection of whether or not to provide the voice notification may be designated by the service provider, the subscriber (e.g., end user 432), or a combination of both.

If the decision made is to provide the voice notification to the destination, then IP-SM-GW 416 extracts information regarding the SMS message from the SIP MESSAGE. For example, IP-SM-GW 416 may extract a sender identifier (e.g., MDN, IP address, name, etc), a timestamp, and text from the SMS message. IP-SM-GW 416 may then attempt to deliver the SMS message to its destination by forwarding the SIP MESSAGE to IMS device 430 through S-CSCF 412. Upon receiving the SIP MESSAGE, IMS device 430 may provide an alert (e.g., a tone) to end user 432 indicating that an SMS message was received. Those skilled in the art will appreciate that IP-SM-GW 416 may attempt to deliver the SMS message to its destination earlier, as FIGS. 5-7 illustrate one example of the messaging that may be used.

End user 432 will also receive a voice notification from IP-SM-GW 416 indicating some information regarding the SMS message. To do so, IP-SM-GW 416 inserts the extracted information from the SMS message into a session description (i.e., SDP) of a SIP INVITE. IP-SM-GW 416 then transmits the SIP INVITE to MRF 418 through S-CSCF 412. In response to the SIP INVITE, MRF 418 sends a SIP 200 OK back to IP-SM-GW 416 through S-CSCF 412. MRF 418 also converts the text extracted from the SMS message into a voice format to generate the voice notification for the SMS message. The voice notification is a voice representation of the text that was extracted from the SMS message. IP-SM-GW 416 then establishes a media session between MRF 418 and IMS device 430 so that MRF 418 may play the voice notification to end user 432.

To set up the media session, IP-SM-GW 416 transmits a SIP (Re)INVITE to IMS device 430 through S-CSCF 412 (see FIG. 7). In response, IMS device 430 transmits a SIP 200 OK to IP-SM-GW 416, and also transmits a SIP ACK to MRF 418. At this point, a RTP media session is established between MRF 418 and IMS device 430. This (second) media session is for the voice notification, while the original (first) media session involving IMS device 430 is still in progress for the voice call. With the second media session established, MRF 418 plays the voice notification to IMS device 430. For example, MRF 418 may play the following voice notification: "Message received from Randy Smith saying 'Meet me at the gym at 6'". The voice notification in this example is meant to be a background to the on-going voice conversation of the voice call. The sound or volume of the voice notification that is played to end user 432 may be softer than the voice conversation for the voice call, so that the voice notification does not affect the voice conversation and is in the background. The actual sound level of the voice notification may be pre-configured. And because the media session is only established with IMS device 430, end user 432 is the only party to the voice call that hears the voice notification.

Because the voice notification is provided during the existing voice call, end user 432 knows that Randy Smith sent an SMS message requesting to meet at the gym at 6. Advantageously, end user 432 is notified of the sender and content of the SMS message audibly so that he/she does not have to interrupt the present voice call in order to view the SMS message.

After the voice notification is played to end user 432, MRF 418 transmits a SIP INVITE to IMS device 430 through S-CSCF 412 to tear down the second media session. In response, IMS device 430 transmits a SIP 200 OK to MRF 418 through S-CSCF 412, and the media session is torn down. If yet another SMS message is received that is intended for IMS device 430, IMS network 406 will operate in a similar fashion to provide a voice notification to end user 432.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. A system comprising:
a message delivery component comprising at least one processor configured to receive a text message intended for a destination via a serving network element, and to initiate delivery of the text message to the destination, wherein the serving network element is operable to detect whether the destination is engaged in an active call and inform the message delivery component accordingly; and
a message notification component comprising at least one processor configured to process the text message received from the serving network element and to detect that the destination is engaged in an active voice call during the delivery of the text message, to identify information for the text message, to convert the text message information into voice data to generate a voice notification, to establish a media session, and to initiate transmission of the voice notification to the destination to be played during the active voice call.

2. The system of claim 1 wherein the voice notification includes at least a sender identifier and a portion of the content of the text message.

3. The system of claim 1 wherein the voice notification is transmitted to the destination to be played as a background to a voice conversation of the voice call.

4. The system of claim 3 wherein a volume of the voice notification is less than a volume of the voice conversation.

5. The system of claim 1 wherein:
the message notification system is further operable to process criteria responsive to detecting that the destination is engaged in an active voice call to determine whether to initiate transmission of the voice notification to the destination.

6. The system of claim 5 wherein the criteria includes an identifier for a sender of the text message.

7. The system of claim 5 wherein the criteria includes a time of day or day of the week.

8. The system of claim 5 wherein the criteria includes a location of the destination.

9. A method comprising:
receiving a text message intended for a destination via a serving network element, wherein the serving network element is operable to detect whether the destination is engaged in an active call;

initiating delivery of the text message to the destination;
processing the text message received from the serving network element and detecting that the destination is engaged in an active voice call during the delivery of the text message;
identifying information for the text message;
converting the text message information into voice data to generate a voice notification;
establishing a media session; and
initiating transmission of the voice notification to the destination to be played during the active voice call.

10. The method of claim 9 wherein the voice notification includes at least a sender identifier and a portion of the content of the text message.

11. The method of claim 9 wherein the voice notification is transmitted to the destination to be played as a background to a voice conversation of the voice call.

12. The method of claim 11 wherein a volume of the voice notification is less than a volume of the voice conversation.

13. The method of claim 9 further comprising:
processing criteria responsive to detecting that the destination is engaged in an active voice call to determine whether to initiate transmission of the voice notification to the destination.

14. The method of claim 13 wherein the criteria includes an identifier for a sender of the text message.

15. The method of claim 13 wherein the criteria includes a time of day or day of the week.

16. The method of claim 13 wherein the criteria includes a location of the destination.

17. A system implemented in an IP Multimedia Subsystem (IMS) network, the system comprising:

a message delivery component comprising at least one processor configured to receive a Short Message Service (SMS) message intended for an IMS device via a serving network element, and to initiate delivery of the SMS message to the IMS device, wherein the serving network element is operable to detect whether the IMS device is engaged in an active call and inform the message delivery component accordingly; and a message notification component comprising at least one processor configured to process the text message received from the serving network element and to detect that the IMS device is engaged in an active voice call during the delivery of the SMS message, to identify information for the SMS message, to convert the SMS message information into voice data to generate a voice notification, to establish a media session, and to initiate transmission of the voice notification to the IMS device to be played during the active voice call.

18. The system of claim 17 wherein the voice notification includes at least a sender identifier and a portion of the content of the text message.

19. The system of claim 17 wherein the message notification component is implemented in an IP Short Message Gateway (IP-SM-GW) and a Media Resource Function (MRF).

20. The system of claim 19 wherein the IP-SM-GW is operable to establish a media session between the MRF and the IMS device during the voice call so that the MRF is able to play the voice notification to the IMS device over the established media session.

* * * * *